No. 840,378. PATENTED JAN. 1, 1907.
W. SALOW.
STEREOSCOPIC ATTACHMENT FOR PHOTOGRAPHIC CAMERAS.
APPLICATION FILED NOV. 16, 1905.
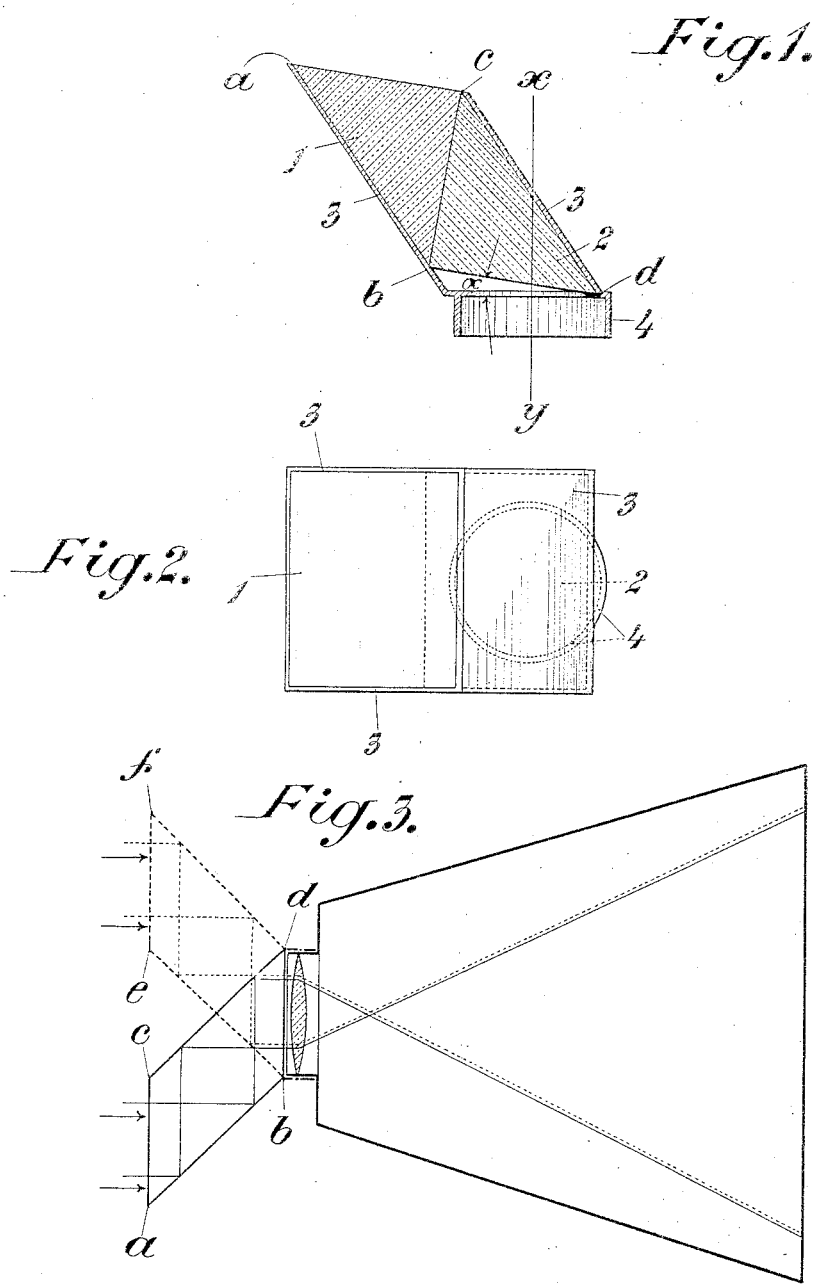
Witnesses:
Inventor
Wilhelm Salow
By James L. Norris
Atty.

UNITED STATES PATENT OFFICE.

WILHELM SALOW, OF ELBERFELD, GERMANY.

STEREOSCOPIC ATTACHMENT FOR PHOTOGRAPHIC CAMERAS.

No. 840,378.  Specification of Letters Patent.  Patented Jan. 1, 1907.

Application filed November 16, 1905. Serial No. 287,645.

*To all whom it may concern:*

Be it known that I, WILHELM SALOW, philosophy student, a subject of the King of Prussia, German Emperor, residing at Elberfeld, in the Kingdom of Prussia, German Empire, have invented certain new and useful Improvements in Stereoscopic Attachments for Photographic Cameras, of which the following is a specification.

This invention relates to a device for producing stereoscopic pictures in photographic cameras and means to provide a device of such class in a manner as hereinafter set forth which when used in connection with a photographic camera will produce two pictures consecutively in the camera, with the distance between the pictures equal to the average distance between the eyes—that is to say, they constitute stereoscopic pictures. Heretofore stereoscopic photographs have usually been taken by means of special expensive photographic apparatus—the so-called "stereoscopic" apparatus—but by employing the stereo attachment according to this invention stereoscopic photographs can be taken in a perfect manner by means of an ordinary photographic camera.

A construction of the stereo attachment according to this invention is illustrated, by way of example, in the accompanying drawings, in which—

Figure 1 is a horizontal longitudinal section; Fig. 2, a front elevation, and Fig. 3 shows how the attachment is connected to the object-glass of the camera.

The two rectangular equilateral prisms 1 and 2 are so placed together that their hypotenuse-surfaces $a\,b$ and $c\,d$ are parallel. The length of the small sides $a\,c$ or $b\,d$ or $c\,b$ is preferably thirty-four millimeters—that is to say, a little more than half the distance between the eyes, for the purpose of obtaining the desired steroscopic effect. The two prisms 1 and 2 are arranged in a casing 3, which is dull black inside and which is provided at the back with a socket 4 for the purpose of placing it on the object-glass of a photographic camera. The two prisms arranged in the casing form a parallelepiped, as will be evident by reference to Fig. 1. The front and the back surfaces of the stereo attachment constituted by the prisms 1 and 2 are uncovered for the purpose of admitting rays of light to the object-glass. In order to do away in this combination of prisms with chromatic phenomena due to the rays striking hypotenuse-surfaces $a\,b$ and $c\,d$ at a smaller angle than forty-two degrees, Fig. 1, and to bring the image produced exactly into the center of the sensitive plate of the photographic camera, the combination of prisms is arranged slightly outside the center $x\,y$ of the socket 4 of the prisms-casing 3 and at an angle $\alpha$ to the object-glass lens, Fig. 1. The size of the said shifting and of the angle of the combination of prisms relatively to the object-glass depend on the kind of glass used.

In the diagrammatic horizontal section (shown in Fig. 3) through the camera with the stereo attachment mounted in the center of the lens no attention has been paid to the shifting and to the angle of the prisms combination required on account of the chromatic phenomena. If no attention is paid to the lines in that figure representing the camera, then the thick full lines show the prism combination in one position and the thick dotted lines in the other position. The thin full lines and the thin dotted lines indicate the path of rays in the two positions of the stereo attachment. By following the path of the rays it will be seen that the hypotenuse-surfaces $a\,b$ and $c\,d$ of the prisms act as full reflectors, and, further, that the two surfaces in Fig. 3 represented by the lines $a\,c$ and $e\,f$ correspond to two object-glasses of the well-known stereoscopic camera. The images produced by reflection fall, however, on the same spot of the sensitive plate and not, as in the well-known stereoscopic camera, on two arranged side by side.

When using the stereo attachment, the camera is first sharply focused. Any plate, film, and instantaneous camera of any size can be used as long as it can be secured to a stand. Then the stereo attachment is secured by its socket 4 to the object-glass, so that the projecting part $a$ points, say, to the left-hand side, (see Fig. 3, full lines,) and then a photograph is taken. Then the sensitive plate is drawn away and the attachment is turned through an angle of one hundred and eighty degrees in such manner that it projects to the right, Fig. 3 dotted. Then the second photograph is taken on a second plate. The time of exposure is of course the same as in ordinary photographs.

Having now particularly described and ascertained the nature of my said invention and in what manner the same is to be performed, I declare that what I claim is—

1. A stereoscopic attachment for the purpose set forth, comprising two glass prisms of rectangular equilateral shape and so arranged with respect to each other that their hypotenuse-surfaces will be in parallelism so that the rays of light will be totally reflected from the hypotenuse-surfaces, and an opaque casing inclosing said prisms and provided with means for attaching it in position.

2. A stereoscopic attachment for photographic cameras comprising a shiftable casing provided with a socket for the attachment of the casing to the object-glass case of the camera, said casing extending obliquely with respect to the object-glass of the camera, and a reflecting means substantially parallelepipedal in contour arranged within said casing and extending obliquely with respect to the object-glass of the camera, said casing maintaining the said reflecting means at the same angle with respect to the object-glass when the said reflecting means is shifted by the casing.

3. A stereoscopic attachment for photographic cameras comprising a shiftable casing provided with a socket at one end adapted to be connected to the camera-body, and a reflecting means within said casing and arranged at an angle with respect to the said socket and extending obliquely with respect to the object-glass of the camera, said reflecting means shiftable with the casing and maintained at the same angle with respect to the object-glass when shifted by the casing.

In testimony whereof I have hereunto set my hand in presence of two subscribing witnesses.

WILHELM SALOW.

Witnesses:
   WOLDEMAR HAUPT,
   HENRY HASPER.